Aug. 3, 1943.  W. V. KIRKPATRICK  2,325,612
MECHANICAL SHORTHAND WRITING MEANS
Filed Jan. 21, 1941  2 Sheets-Sheet 2
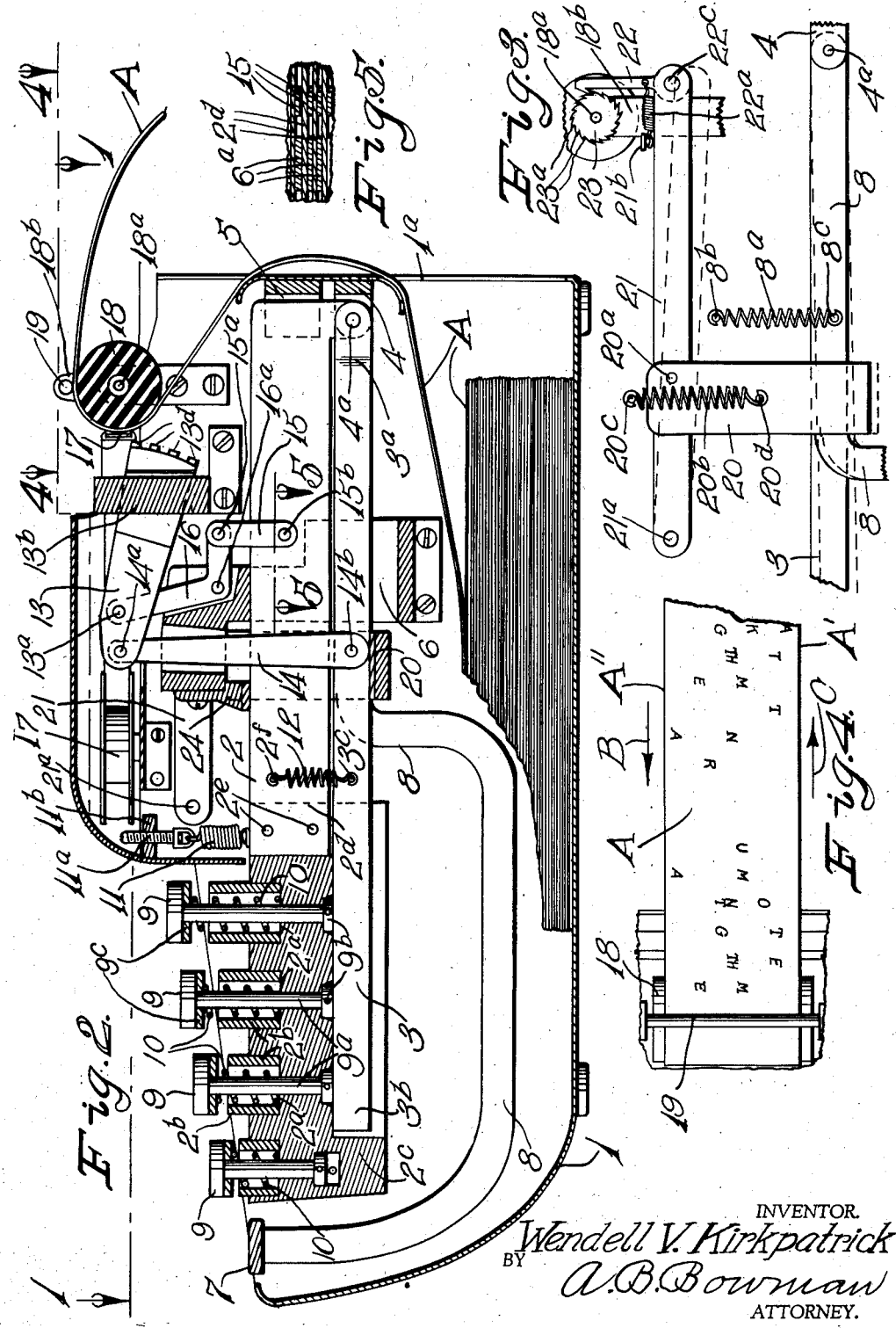
INVENTOR.
Wendell V. Kirkpatrick
BY
A. B. Bowman
ATTORNEY.

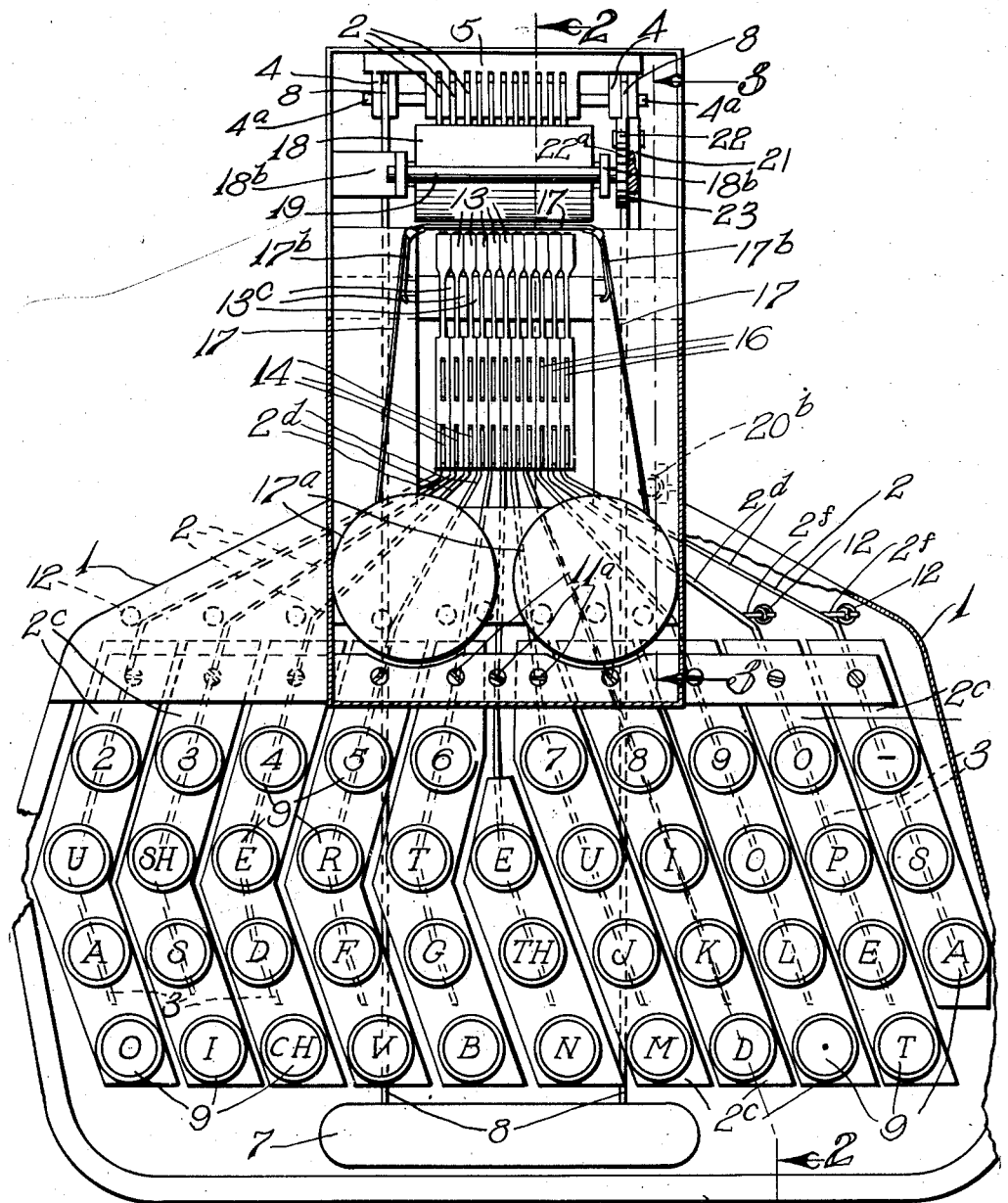

Patented Aug. 3, 1943

2,325,612

UNITED STATES PATENT OFFICE 2,325,612

MECHANICAL SHORTHAND WRITING MEANS

Wendell V. Kirkpatrick, San Diego, Calif.

Application January 21, 1941, Serial No. 375,273

12 Claims. (Cl. 197—9)

My invention relates to a mechanical shorthand writing means and method, more particularly a means and method arranged to be readily understood and used by students of conventional shorthand writing theory and the objects of my invention are:

First, to provide a shorthand writing means and method of this class which is readily and quickly understood and utilized, especially by students of the conventional Gregg shorthand method;

Second, to provide a shorthand writing means of this class in which substantially all of the most used Gregg shorthand symbols are each indicated by letter equivalents with the operation of one key of said means;

Third, to provide a shorthand writing means of this class in which substantially all of the keys and corresponding type characters arranged to write shorthand symbols are the same as the conventional typewriter characters and are in the same position as said characters on the conventional typewriter keyboard providing natural adaptation of a typist to my shorthand writing means;

Fourth, to provide a shorthand writing means and method of this class with which the operator thereof may designate complete and extensive words with a single stroke of cooperatively arranged keys of said means;

Fifth, to provide a shorthand writing means of this class in which the keyboard is provided with a plurality of keys arranged to actuate corresponding typing members bearing identical characters thereon providing an arrangement of the keys and writing operation of said means whereby the operator thereof may designate various combinations of characters in various continuity;

Sixth, to provide a mechanical shorthand writing means of this class which promotes the development of relatively great speed and legibility in writing, affords ease to the operator thereof and is arranged to be used in cooperative relation with the conventional methods of hand-written shorthand;

Seventh, to provide a shorthand writing method of this class in which the conventional Gregg shorthand sound combinations are indicated by natural, simple and meaningful letter equivalents thereof providing a very clear and easily understood indication of various subject matter when written in accordance with said method;

Eighth, to provide a mechanical shorthand writing means and method of this class in which the subject matter written therewith may be easily supplied with interpolations or the like by means of method related hand-written shorthand without confusion;

Ninth, to provide a mechanical shorthand writing means and method of this class which is especially advantageous to left-handed persons who have difficulty in mastering fluent handwriting procedure which was primarily designed for right-handed persons;

Tenth, to provide a mechanical shorthand writing means of this class which is especially adapted for use in spelling out technical words for which no shorthand symbols are available due to the arrangement of the keys thereof which conform in character and position to the conventional typewriter keyboard keys whereby the operator thereof may spell out said technical words at the usual typewriter speed of the operator;

Eleventh, to provide a shorthand writing means and method of this class which may be taught in theory combination with hand-written shorthand methods;

Twelfth, to provide a shorthand writing means and method of this class which may be used especially in combination with publications of the conventional Gregg shorthand method prepared especially for certain business organizations, professions and foreign languages;

Thirteenth, to provide a novel shorthand writing means of this class;

Fourteenth, to provide a novel shorthand writing method of this class;

Fifteenth, to provide a mechanical shorthand writing means of this class which is arranged to print numerous characters in upright transverse relation on a movable strip of paper whereby several of said characters are readable in continuity transversely of said paper strip; and Sixteenth, to provide a mechanical shorthand writing means of this class which is very simple and economical of construction in accordance with its utility, efficient in its action and which will not readily deteriorate or get out of order.

With these and other objects in view as will appear hereinafter my invention consists of certain novel features of construction, combination and arrangement of parts and portions and certain methods as will be hereinafter described in detail and particularly set forth in the appended claims, reference being had to the accompanying drawings and to the characters of reference thereon which form a part of this application in which:

Figure 1 is a plan sectional view of my mechanical shorthand writing means taken from the line 1—1 of Fig. 2 showing portions broken away and in section to facilitate the illustration; Fig. 2 is a sectional view taken from the line 2—2 of Fig. 1 showing the type receiving strip in its operative relation with my mechanical shorthand writing means; Fig. 3 is a fragmentary sectional view taken from the line 3—3 of Fig. 1; Fig. 4 is a fragmentary top or plan view of a portion of my mechanical shorthand writing means taken from the line 4—4 of Fig. 2 and Fig. 5 is a fragmentary sectional view taken from the line 5—5 of Fig. 2.

Similar characters of reference refer to similar parts and portions throughout the several views of the drawings.

The casing 1, main key supporting levers 2, key engaging levers 3, key lever journal member 4, key lever guides 5 and 6, spacing bar 7, spacing bar levers 8, keys 9, key supporting springs 10, adjustable lever supporting springs 11, lever interconnecting springs 12, type supporting members 13, type member operating links 14 and 15, type member operating levers 16, ribbon 17, platen roller 18, friction roller 19, platen roller operating spacer member 20, ratchet operating lever 21, ratchet pawl 22, ratchet wheel 23 and the lever stop member 24 constitute the principal parts and portions of my mechanical shorthand writing means used in carrying out my shorthand writing methods.

The casing 1 is a hollow substantially box-like casing, preferably made of sheet metal, as shown best in Figs. 1 and 2 of the drawings.

Rigidly secured on the inner side of this casing 1 at one end is the key lever journal member 4. Rigidly positioned in connection with this key lever journal member 4 is a pin 4a. Pivotally mounted on this pin 4a are the main key supporting levers 2 and the key engaging levers 3, all as shown best in Fig. 2 of the drawings. The keys 9 are each provided with shank portions 9a which are reciprocably mounted in the main key supporting levers 2, as shown best in Fig. 2 of the drawings. Secured on the lower end of these shank portions 9a of the keys 9 are stop members 9b arranged to limit the shifting action of the shank portion 9a of the keys 9 when actuated by the key supporting springs 10 which tend to force the keys 9 upwardly away from the main key supporting levers 2.

The key supporting springs 10 are coil compression springs mounted around the shank portions 9a of the keys 9 interposed between the lower side of the keys 9 and the bottom of recessed portions 2a in the upper side of the main key supporting levers 2, all as shown best in Fig. 2 of the drawings.

Positioned in these recessed portions 2a are sleeve members 2b which encase the key supporting springs 10 and are arranged to limit the downward movement of the keys 9 by engagement of the cushion washers 9c with the upper end of said sleeves 2b, all as shown best in Fig. 2 of the drawings. The outer end portion 2c of each of the main key supporting levers 2 is preferably made of light plastic material or other suitable light material and is arranged to support the keys 9 in substantially the relation as shown in Figs. 1 and 2 of the drawings. These portions 2c of the main key supporting levers 2 are secured to the thin plate-like portions 2d of the main key supporting lever 2 by means of the pins 2e, as shown best in Fig. 2 of the drawings. The flat plate-like portions 2d of the main key supporting levers 2 are guided in the key lever guide 5 near and above their pivotal mounting on the pin 4a, as shown best in Figs. 1 and 2 of the drawings. These main key supporting levers 2 at their portions 2d are also guided by the key lever guide 6 which is positioned intermediate the key lever guide 5 and the portion 2c of each of these main key casing supporting levers 2, as shown best in Figs. 2 and 5 of the drawings. In Figure 5 of the drawings, the guide portions 6a of the key lever guide 6 are shown positioned intermediate each of the portions 2d of the main casing supporting levers 2.

It will be noted that the key engaging levers 3 at their journalled ends are interposed between the main key supporting levers 2 on the pin 4a. Each of the key engaging levers 3 is bent at its portion 3a so that it is in vertical alignment with the main key supporting lever 2 directly above it providing an arrangement whereby the key engaging levers 3 are positioned in the same guide channels of the lever guide 6 as are the portions 2d of the main key supporting levers 2. These key engaging levers 3 are arranged to conform in vertical alignment with the main key supporting levers 2 so that the end portions 3b of these key engaging levers 3 are engaged at their upper side edges by the stop members 9b mounted on the shank portions 9a of the keys 9, all as shown best in Fig. 2 of the drawings and by dash lines in Fig. 1 of the drawings.

It will be noted that the row of the keys 9 adjacent the spacing bar 7 do not engage the key engaging levers 3. This row of the keys 9 adjacent the spacing bar 7 is arranged for use in providing simultaneous pivotal operation of individual main key supporting levers 2, together with corresponding key engaging levers 3. Each of these keys 9 in the row adjacent the spacing bar 7 is arranged in reciprocal operative relation with the portion 2c of each of the main key supporting levers 2 providing a necessary amount of reciprocating action relatively to the other rows of keys 9 positioned on the opposite side thereof from the spacing bar 7.

The adjustable lever supporting springs 11 are secured on the upper side edges of the main key supporting lever 2 and are adjustably supported at their upper end by means of the screws 11a which are arranged in screw threaded relation with a bar 11b which is secured on the inner side of the casing 1, all as shown best in Figs. 1 and 2 of the drawings.

The lever interconnecting springs 12 are interposed between the main key supporting lever 2 and the key engaging lever 3, as shown best in Fig. 2 of the drawings. Secured on each of the key engaging levers 3 is a pin 3c to which the lower end of one of the lever interconnecting springs 12 is secured. The upper end of each of these lever interconnecting springs 12 is secured to one of the main key supporting levers 2 by means of a pin 2f extending outwardly from each of said main key supporting members 2, all as shown best in Figs. 1 and 2 of the drawings.

The spacing bar 7 is rigidly secured on the extending ends of the spacing bar levers 8 and these spacing bar levers 8 are arranged to extend through the lever guide 6 and are pivotally mounted at their opposite ends on the pin 4a in the lever journal member 4, as shown best in Figs. 1 and 2 of the drawings.

Engaging the lower side edges of the spacing bar levers 8 and the key engaging levers 3 is the platen roller operating spacer member 20. This platen roller operating spacer member 20 is pivotally mounted on the ratchet operating lever 21 by means of the pin 20a.

The ratchet operating lever 21 is pivotally mounted on a pin 21a which is rigidly secured to the casing 1, shown best in Figs. 2 and 3 of the drawings.

The platen roller operating spacer member 20 is resiliently supported by a spring 20b which is secured to a pin 20c at its upper end, which pin 20c is rigidly secured on the inner side of the casing 1, as shown best in Fig. 3 of the drawings and indicated by dash lines in Fig. 1 of the drawings. The lower end of this spring 20b is rigidly secured on a pin 20d secured to the platen roller operating spacer member 20.

Each of the spacing bar levers 8 is resiliently supported by a spring 8a, the upper end of which is secured on a pin 8b in rigid connected relation with the casing 1. The lower end of each of these springs 8a is connected with a pin 8c secured on the outer side of each of the spacing bar levers 8, as shown best in Fig. 3 of the drawings.

The platen roller 18 is provided with a central shaft 18a which is journalled in brackets 18b at opposite ends of said platen roller 18, as shown best in Figs. 1 and 2 of the drawings. Secured on this central shaft 18a outwardly of one of the brackets 18b is the ratchet wheel 23. This ratchet wheel 23 is provided with angular teeth portions 23a arranged to be engaged by the ratchet pawl 22 which is pivotally mounted on the opposite end of the ratchet operating lever 21 from the pin 21a. Interconnecting the ratchet pawl 22 and an upwardly extending pin 21b on the ratchet operating lever 21 is a spring 22a. It will be here noted that the ratchet pawl 22 is pivotally mounted on the ratchet operating lever 21 by means of the pin 22c.

Positioned in close spaced relation with the upper peripheral side of the platen roller 18 is the friction roller 19, the opposite ends of which are journalled in the brackets 18b, as shown best in Fig. 1 of the drawings. Referring particularly to Fig. 2 of the drawings, it will be observed that this friction roller 19 is arranged to engage the paper A at the opposite sides thereof from the platen roller 18 providing a frictional engaged relation of the paper A with the platen roller 18 as it is revolved by the ratchet wheel 23 in cooperative relation with the ratchet pawl 22 operated by the ratchet operating lever 21.

The ribbon 17 is similar to a conventional typewriter ribbon and is mounted on cooperating spools 17a and is guided by guide member 17b in cooperative relation with the opposite ends of the platen roller 18, as shown best in Fig. 1 of the drawings.

The type supporting members 13 are each pivotally mounted on one of the type member operating levers 16 by means of a pin 13a, as shown best in Fig. 2 of the drawings. Each of these type member operating levers 16 is mounted in pivotal relation with the key lever guide 6 by means of the pin 16a. Interconnecting each of these type member operating levers 16 and one of the main key supporting levers 2 is one of the type member operating links 15. The upper end of each of these type member operating links 15 is secured to one of the type member operating levers 16 by means of a pin 15a and the lower end of each of these type member operating links 15 is secured to one of the main key operating levers 2 by means of a pin 15b. Pivotally connected with each of the type supporting members 13 at one side of the pins 13a is one of the type member operating links 14. Each of these type member operating links 14 is pivotally secured to one of the type supporting members 13 by means of the pin 14a and each of the type member operating links 14 is secured to one of the key engaging levers 3 in pivotal relation therewith by means of one of the pins 14b. The stop member 24 is rigidly secured to the upper portion of the key lever guide 6 and is arranged to engage the upper side edges of each of the main key supporting levers 2, as shown best in Fig. 2 of the drawings.

The type supporting members 13 are provided with a guide member 13b, as shown best in Figs. 1 and 2 of the drawings, which is rigidly secured on the inner side of the casing 1. This guide member 13b is provided with spaced finger portions 13c which are interposed between the type supporting members 13 for guiding said type supporting members 13 during pivotal and reciprocating movement thereof.

The operation of my mechanical shorthand writing means is substantially as follows:

A conventional folded strip of paper A is positioned in the lower portion of the casing 1 and extends outwardly through the opening 1a in the casing 1 and backwardly around the platen roller 18 and outwardly over the upper side thereof as shown in Fig. 2 of the drawings. Each time one of the key engaging levers 3 or the spacing bar lever 7 is forced downwardly engaging the platen roller operating spacer member 20, the ratchet operating lever 21 is pivotally shifted in connection therewith operating the ratchet pawl in its engagement with its ratchet wheel 23 performing intermittent revoluble operation of the platen roller 18, as shown by dash lines in Fig. 3 of the drawings. As the keys 9 are depressed they compress the key supporting springs 10 and reciprocate in the portions 2c of the main key supporting levers 2 forcing the key engaging levers 3 downwardly causing the type member operating link 14 to pivot the type supporting members 13 on the pins 13a bringing one of the type characters 13d into proper position relatively with the platen roller 18 for printing against the ribbon 17 and on the strip of paper A. As the reciprocation of the shank portions 9a of the keys 9 forces said type characters 13d into position, the cushion washers 9c engage the upper edge of the sleeves 2b and the keys then force the main key supporting levers 2 downwardly carrying the type member operating links 15 downwardly and pivoting the type supporting members 13 toward the platen roller 18 bringing the type characters 13d into position against the ribbon and imprinting upon the paper strip A the desired characters. It will be noted that the pivotal movement of the type supporting member 13 on the pins 13a continues as the downward movement of the main key supporting lever 2 takes place. The row of keys 9 adjacent the spacing bar 7 do not engage the key engaging levers 3 but act upon the main key supporting levers 2 alone. As these keys 9 adjacent the spacing bar 7 are pressed downwardly, the main key supporting lever 2, together with the key engaging levers 3, pivot on the pin 4a and shift the desired type characters upwardly and forwardly toward the platen roller 18 for imprinting said characters upon the paper strip A.

The operation of the ribbon 17, together with the spool 17a is substantially conventional and similar to the operation of a conventional typewriter ribbon.

It will be here noted that means for revolving the spool 17a is not shown in the drawings and is no part of my present invention.

Referring to Fig. 4 of the drawings, it will be observed that the paper strip A issuing from my mechanical shorthand writing means over the platen roller 18 bears typewritten characters thereon which correspond to the various characters indicated on the keys 9 as shown in Fig. 1 of the drawings.

The characters indicated on the paper strip A near the side edge A′ thereof correspond with the keys 9 on the right hand side of the keyboard of my mechanical shorthand writing means, as shown in Fig. 1 of the drawings. The characters on the paper strip A near the side edge A″ thereof correspond with the keys 9 on the left hand side of my mechanical shorthand writing means, as shown in Fig. 1 of the drawings.

It will be noted that the upright alignment of the characters on the paper strip A is arranged transversely of said paper strip A and that these characters on the paper strip A are read in continuity from the side A′ of the paper strip A toward the side A″ of said paper strip A, each row of characters being read transversely of the paper strip A, one after the other, and in the direction as indicated by the arrow B in Fig. 4 of the drawings.

My methods for writing shorthand used in connection with my mechanical shorthand writing means are substantially as follows:

As hereinbefore set out my methods for writing shorthand as used in connection with my mechanical shorthand writing means are associated with the conventional Gregg shorthand methods. The following sound combinations are the letter equivalents of the basic Gregg shorthand characters.

```
k g r l n m t d th p b f v ch j s sh .

n a e o u e o o i a t d t d n m t t d d
g       u u e   e n n m m t d f v f v j p p j k t g d t d d m k s a s u u u u
n n n n r r r s d t d n s s g p e a o r
t d t d                     r th a e s e e n r d m r m s s p p p t s k
r   r r n l s s s e u e s k k o o u l p i
                              r r   sh   sh
                                    sh p sh s u   o s
i u   u sh g t
      r
```

Each of these letter equivalents of the Gregg shorthand characters can be written with a single stroke of the keys of my mechanical shorthand writing means. These sound combinations and the combination of them are all that are required to express all of the words that are expressed by use of the Gregg shorthand methods.

Many of the above letters and combinations express complete words in themselves. A few examples will show how they may be combined to make other words and phrases:

```
a       t       m t     n       r   .   u
k       th      e .     a
g
I can go to the meeting in an hour. You m       o       t       e   m
a       n   -   g       th  e   .
t
may want to go with me.

v       f       m       d       t       f       s
e       e       n       f       m       ch
        u               i
Very few men would find time for such d a     e       b               s       r       n
t l     n       s               s       sh  .   d
  s                             o
details when business is so rushing and t       d k     t       a       f
s       f               r       a
                a
it is difficult to arrange for a s s .           th      s       k l     g p     n
                e       e       b       r s
                s       v               u
                        e
                        s
substitute. These service club groups in s       s       r   .           m       g   .
e       e       d               ch
v       t       u
        e
        s
several cities are doing much good.
```

The paper strip A is of sufficient width to accommodate the eleven letters or characters printed end to end in transverse relation with the strip, as shown, as shown in Fig. 4 of the drawings. As viewed by the operator of my mechanical shorthand writing means, the letters are typed on the paper strip A on their right side so that combinations written in order from right to left across the tape horizontally as the tape passes through the machine will be read vertically from the edge A′ of the paper strip toward the edge A″ of the paper strip after it is removed from the machine and turned at a right angle to the printing position, all as shown best in Fig. 4 of the drawings.

The arrow C in Fig. 4 of the drawings illustrates the directional movement of the paper strip, while the arrow B indicates the direction of procedure while reading the subject matter on the paper strip A, all as shown best in Fig. 4 of the drawings.

It will be obvious to anyone who understands the Gregg shorthand theory to associate the letter equivalents as hereinbefore set out with the sound combinations of the basic Gregg characters. Most of the keys on my mechanical shorthand writing means are arranged in the position of conventional typewriter keys and are arranged to control similar characters to the keys on a conventional typewriter. Therefore when it is desired to spell out technical words for which there is no Gregg shorthand symbol or combination of such symbols, the operator of my mechanical shorthand writing means may write out technical words or terms at usual typewriter speed. Referring particularly to Fig. 1, it will be observed that duplicate characters have been supplied in relation with the keys 9 so that various combinations of characters may be written in various continuity from the side edge A' to the side edge A" of the paper strip A.

Though I have shown and described a particular construction, combination and arrangement of parts and portions and particular methods, I do not wish to be limited to this particular construction, combination and arrangement of parts and portions, nor to the particular methods, but desire to include in the scope of my invention the construction, combination and arrangement and the methods substantially as set forth in the appended claims.

Having thus described my invention, what I claim as new and desire to secure by Letters Patent is:

1. In a mechanical shorthand writing means of the class described, the combination with a platen roller adapted to position a paper strip thereon, and a ribbon in spaced relation therewith, of a plurality of shiftable type supporting members provided with type thereon arranged in separate single consecutive rows parallel with said roller and facing the same, the normal upright disposed relation of said type arranged in parallel longtudinal relation with said roller whereby typed character impressions printed by said type on said paper strip are disposed in upright relation one above the other readable in single rows in continuity transversely of said paper strip.

2. In a mechanical shorthand writing means of the class described, the combination with a platen roller adapted to position a paper strip thereon, and a ribbon in spaced relation therewith, of a plurality of shiftable type supporting members provided with type thereon arranged in rows parallel with said roller and facing the same, the normal upright disposed relation of said type arranged in parallel longitudinal relation with said roller whereby typed character impressions printed by said type on said paper strip are disposed in upright relation one above the other readable in continuity transversely of said paper strip, a plurality of pivotally mounted type member operating levers pivotally connected with said type supporting members intermediate the ends of said type supporting members, and main key supporting levers provided with keys on their extended ends and pivotally mounted at their opposite ends, said type member operating levers pivotally connected with said key supporting levers at one side of said opposite pivotally mounted end of each of said main key supporting levers.

3. In a mechanical shorthand writing means of the class described, the combination with a platen roller adapted to position a paper strip thereon, and a ribbon in spaced relation therewith, of a plurality of shiftable type supporting members provided with type thereon arranged in rows parallel with said roller and facing the same, the normal upright disposed relation of said type arranged in parallel longitudinal relation with said roller whereby typed character impressions printed by said type on said paper strip are disposed in upright relation one above the other readable in continuity transversely of said paper strip, a plurality of stationary pivotally mounted type member operating levers pivotally connected with said type supporting members intermediate the ends of said type supporting members, main key supporting levers provided with keys on their extended ends and pivotally mounted at their opposite ends, said type member operating levers pivotally connected with said key supporting levers at one side of said opposite pivotally mounted end of each of said main key supporting levers, said keys provided with shank portions reciprocally mounted in said main key supporting levers, key engaging levers each pivotally mounted at one end and positioned in adjacent relation with said shank portions of said keys and engageable therewith, and type member operating links pivotally connected at their upper ends with said type supporting members at their opposite ends from said type, the lower ends of said type member operating links pivotally connected with said key engaging levers intermediate the ends of said key engaging levers.

4. In a mechanical writing means of the class described, the combination of main key supporting levers each pivotally mounted at one end, keys reciprocably mounted in connection with the opposite end of each of said main key supporting levers and arranged to shift the same, pivotally mounted key engaging levers engageable with said keys and operative thereby independently of said main key supporting levers with the reciprocating movement of said keys relatively to said main key supporting levers, type member operating levers pivotally connected with said main key supporting levers and type supporting members pivotally mounted on said type member operating levers, said key engaging levers pivotally connected with said type supporting members.

5. In a mechanical writing means of the class described, the combination of main key supporting levers each pivotally mounted at one end, keys reciprocably mounted in connection with the opposite end of each of said main key supporting levers and arranged to shift the same, pivotally mounted key engaging levers engageable with said keys and operative thereby independently of said main key supporting levers with the reciprocating movement of said keys relatively to said main key supporting levers, type member operating levers pivotally connected with said main key supporting levers and type supporting members pivotally mounted on said type member operating levers, said key engaging levers pivotally connected with said type supporting members, said type supporting members provided with several type character members thereon.

6. In a mechanical writing means of the class described, the combination of main key supporting levers each pivotally mounted at one end, keys reciprocably mounted in connection with the opposite end of each of said main key supporting levers and arranged to shift the same, pivotally mounted key engaging levers engageable with said keys and operative thereby independently of said main key supporting levers with the reciprocating movement of said keys relatively to said main key supporting levers, type member operating levers pivotally connected with said main key supporting levers and type supporting members pivotally mounted on said type member operating levers, said key engaging levers pivotally connected with said type supporting members, said type supporting members provided with several type character members thereon, and a platen roller in spaced relation therewith.

7. In a mechanical writing means of the class described, the combination of main key supporting levers each pivotally mounted at one end, keys reciprocably mounted in connection with the opposite end of each of said main key supporting levers and arranged to shift the same, pivotally mounted key engaging levers engageable with said keys and operative thereby independently of said main key supporting levers in response to the reciprocating movement of said keys relatively to said main key supporting levers, type member operating levers connected with said main key supporting levers and type supporting members pivotally mounted on said type member operating levers, said type supporting members provided with several type character members thereon, a platen roller in spaced relation therewith and link means interconnecting said key engaging levers and said type supporting members.

8. In a mechanical shorthand writing means of the class described, the combination with a ribbon and a platen roller adapted to position a paper strip thereon, of a plurality of type supporting members shiftably mounted in relation to said ribbon and said roller and having type thereon positioned on their sides and arranged in separate single consecutive rows transversely of said paper strip whereby typed character impressions representing subject matter printed by said type supporting members on said paper strip are positioned in upright relation one above the other readable in single rows in continuity transversely of said paper strip.

9. In a mechanical shorthand writing means of the class described, the combination with a ribbon and a platen roller adapted to position a paper strip thereon, of a plurality of type supporting members shiftably mounted in relation to said ribbon and said roller and having type thereon positioned on their right sides longitudinally disposed to said platen roller and arranged in separate single consecutive rows transversely of said paper strip whereby typed character impressions representing subject matter printed by said type supporting members on said paper strip are positioned in upright relation one above the other readable in single rows in continuity transversely of said paper strip.

10. In a mechanical shorthand writing means of the class described, the combination with a platen roller adapted to position a paper strip thereon and a ribbon in spaced relation therewith, of a plurality of type supporting members arranged in pivotally and reciprocably mounted relation with said roller and provided with type character members thereon arranged in rows parallel with said roller and facing the same, the normal upright disposed relation of said type arranged in parallel longitudinal relation with said roller whereby typed character impressions printed by said type on said paper strip are disposed in upright relation one above the other readable in continuity transversely of said paper strip.

11. In a mechanical shorthand writing means of the class described, the combination with a platen roller adapted to position a paper strip thereon and a ribbon in spaced relation therewith, of a plurality of shiftable type supporting members provided with type thereon arranged in rows parallel with said roller and facing the same, the normal upright disposed relation of said type arranged in parallel longitudinal relation with said roller whereby typed character impressions printed by said type on said paper strip are disposed in upright relation one above the other readable in continuity transversely of said paper strip, a plurality of stationary pivotally mounted type member operating levers pivotally connected with said type supporting members intermediate the ends of said type supporting members and main key supporting levers provided with keys on their extended ends and pivotally mounted at their opposite ends, said type member operating levers pivotally connected with said key supporting levers at one side of said opposite pivotally mounted end of said main key supporting levers, said keys provided with shank portions reciprocably mounted in said main key supporting levers and key engaging and type operating levers engageable therewith.

12. In a mechanical shorthand writing means of the class described, the combination with a platen roller adapted to position a paper strip thereon and a ribbon in spaced relation therewith, of a plurality of type supporting members arranged in pivotally and reciprocably mounted relation with said roller and provided with character members thereon in rows parallel with said roller and facing the same, the normal upright disposed relation of said type arranged in parallel longitudinal relation with said roller whereby type character impressions printed by said type on said paper strip are disposed in upright relation one above the other readable in continuity transversely of said paper strip, a plurality of stationary pivotally mounted type member operating levers pivotally connected with said type supporting members intermediate the ends of said type supporting members, main key supporting levers provided with keys on their extended ends and pivotally mounted at their opposite ends, said type member operating levers pivotally connected with said key supporting levers at one side of said opposite pivotally mounted end of each of said main key supporting levers, said keys provided with shank portions reciprocably mounted in said main key supporting levers and key engaging and type operating levers each pivotally mounted at one end and positioned in adjacent relation with said shank portion of said keys and engageable therewith.

WENDELL V. KIRKPATRICK.